No. 790,368. PATENTED MAY 23, 1905.
C. W. JOHNSON.
ALTERNATING CURRENT MACHINE.
APPLICATION FILED OCT. 30, 1903.
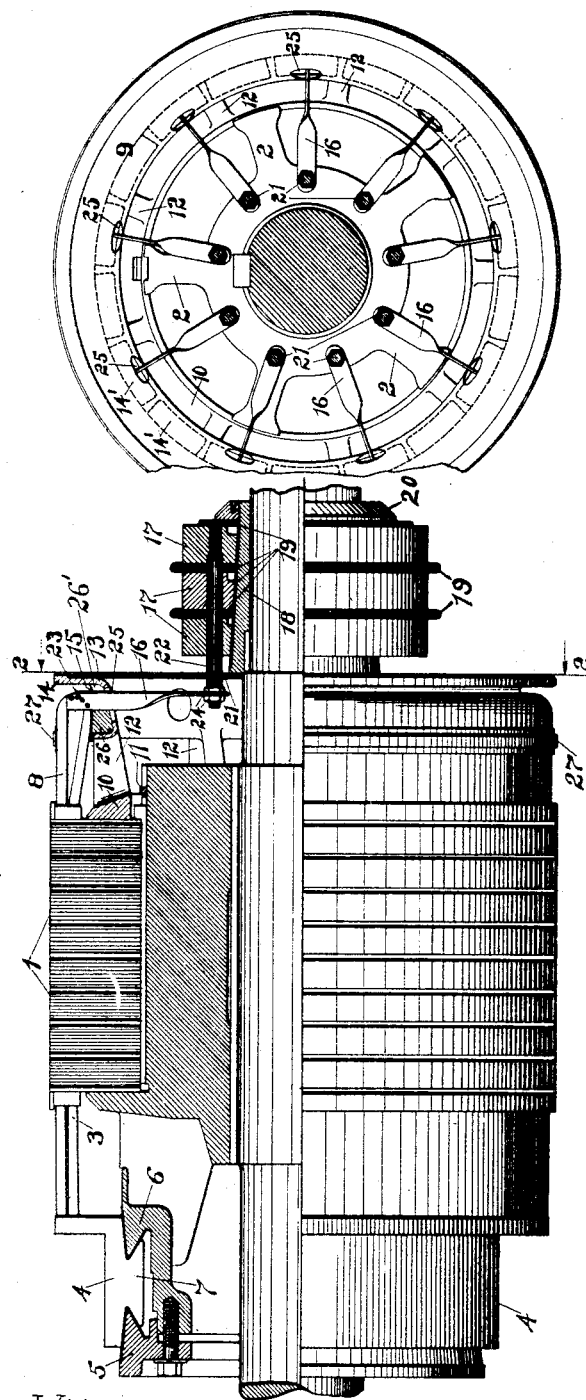
Witnesses
Inventor
Charles W. Johnson.
By
C. V. Edwards
Attorney.

No. 790,368.

Patented May 23, 1905.

UNITED STATES PATENT OFFICE.

CHARLES W. JOHNSON, OF NORWOOD, OHIO, ASSIGNOR, BY MESNE ASSIGNMENTS, TO THE BULLOCK ELECTRIC COMPANY, A CORPORATION OF OHIO.

ALTERNATING-CURRENT MACHINE.

SPECIFICATION forming part of Letters Patent No. 790,368, dated May 23, 1905.

Application filed October 30, 1903. Serial No. 179,190.

*To all whom it may concern:*

Be it known that I, CHARLES W. JOHNSON, a citizen of the United States, residing at Norwood, in the county of Hamilton and State of Ohio, have invented certain new and useful Improvements in Alternating-Current Machines, of which the following is a full, clear, and exact specification.

My invention relates to the rotating element of alternating-current machines, and particularly to connecting the windings to collector-rings, and is applicable to the rotors of induction-motors, to rotary converters, and to other machines in which the winding of the rotary element is connected to slip-rings.

The object of my invention is to provide a suitable support for the end connections of the windings and to produce a simple and compact arrangement of the connecting-leads.

By my invention the end connections of the windings are supported upon an end head and the connections to the slip-rings pass through the end head toward the axis of the machine. In this manner a very direct connection is obtained, giving a simple construction, and the connections are inclosed and well protected by the end head.

The details of my invention will be understood by reference to the following description and accompanying drawings, which show the preferred form of construction, and the novelty thereof will be more definitely stated in the appended claims.

Figure 1 is a side view, partly in section, of the rotating element of a rotary converter. Fig. 2 is a sectional view on the line 2 2 of Fig. 1. Fig. 3 is a sectional view of a part of the rotor of an induction-motor, and Fig. 4 is a detail.

Referring to Figs. 1 and 2, the laminated core 1, mounted on the arms 2 of the spider, carries the winding 3. At the left is the direct-current end, the commutator being shown at 4, which is securely held in place by the end ring 5 and the flange 6, which engage the dovetail 7 of the commutator-segments. The alternating-current end is shown at the right in Fig. 1. The end connections are shown at 8, and these are supported on the end head 9. This consists of a plate 10, which serves to clamp the laminations of the core together, and is retained in place by any convenient means, such as key 11. Arms 12 extend from the plate 10 and support a cylindrical part 13, having the flange 14. The cylindrical part is provided with a series of pockets 14'. (Shown in dotted lines in Fig. 2.) Over the pockets lies a layer of insulating material 15, upon which rest the end connections 8. The end connections are tapped at equally-spaced points around the periphery and connected by leads 16 to the collector-rings 17. The armature shown is adapted for a six-pole machine, and each of the three collector-rings is connected to three points of the same potential spaced one hundred and twenty degrees apart. This armature is therefore adapted to convert a direct current to a three-phase alternating current, or vice versa. The number of alternating-current leads may, however, be varied without departing from the spirit of my invention and is equally well adapted for other phases or for machines having a different number of poles. The rings 17 are mounted upon conical hub 18, being insulated therefrom and from each other by insulation 19. The nut 20, also insulated from the adjacent ring, firmly locks the parts together. Three threaded rods 21 engage each of the rings 17 and are insulated from the remaining rings by insulation 22. As shown, the ends of the rods project well within the end head 9. For connecting the winding and rods 21 I use leads 16, formed of flat metal strips. The outer ends are secured by rivets 23 to the windings and the inner ends clamped between the nuts 24 on the rods 21. The strips, as shown, are twisted so that the ends of each lead lie in planes at right angles to each other. The leads pass through certain of the pockets 14' in the end head and holes 25 in the bottom of the pockets. A wooden block 26 is fitted in each pocket, through which a lead passes, and a saw-cut 26' made in the block to receive the lead, as shown in Fig. 4. The leads may be covered by insulating material. The end connections are maintained in place by the encircling band 27.

It is thus apparent that I have produced a construction in which the parts are well supported and protected, as well as being neatly arranged.

In Fig. 3, showing a portion of the rotor of an induction-motor, the laminated core 30 is carried on the spider 31 and clamped between the end heads 32 by a number of bolts 33. The end heads are provided with the arms 34 and supporting-shelves 35, having a series of peripheral pockets 36, similar to the end head 9. The end connections 37 of the windings are thus similarly supported. The winding is connected at certain points by leads 38 to collector-rings in a similar manner to that shown in Figs. 1 and 2, passing through certain of the pockets and being held therein by the blocks 39. Those pockets not occupied by blocks may serve as convenient means for balancing the rotating element in each case, pockets on the light side being filled with lead for this purpose.

I claim as my invention—

1. In a dynamo-electric machine, the combination of a core and windings therefor, an end head for supporting the end connections, said end head having openings, leads passing through said openings and collector-rings to which said leads are connected.

2. In a dynamo-electric machine, the combination of a core and windings therefor, an end head for supporting the end connections, said end head having openings, leads passing through said openings and extending within the end head and collector-rings to which said leads are connected.

3. In a dynamo-electric machine, the combination of a core and windings therefor, an end head for supporting the end connections, said end head having openings, leads passing through said openings and collector-rings to which said leads are connected, said leads consisting of flat metal strips twisted so that the ends are in planes at right angles to each other.

4. In a dynamo-electric machine, the combination of a core and windings therefor, an end head for supporting the end connections, said end head having pockets, leads passing through openings in said end head and collector-rings to which said leads are connected.

5. In a dynamo-electric machine, the combination of a core and windings therefor, an end head for supporting the end connections, said end head having pockets, leads passing through said pockets, blocks in said pockets for guiding the leads, and collector-rings to which said leads are connected.

6. In a dynamo-electric machine, the combination of a core and windings therefor, an end head for supporting the end connections, said end head having pockets, insulating material covering said pockets, leads passing through a part only of said pockets, blocks fitted in those pockets through which the leads pass, said blocks serving to guide the leads and collector-rings to which said leads are connected.

7. In a dynamo-electric machine, the combination of a core and windings therefor, an end head for supporting the end connections, said end head having pockets, leads of flat metal strips passing through said pockets, wooden blocks fitted in said pockets and having slotted openings to receive the leads, and collector-rings to which said leads are connected.

In testimony whereof I affix my signature in presence of two witnesses.

CHARLES W. JOHNSON

Witnesses:
SANFORD KLEIN,
L. K. SAGER.